(12) United States Patent
Barzel et al.

(10) Patent No.: US 9,075,659 B2
(45) Date of Patent: Jul. 7, 2015

(54) TASK ALLOCATION IN A COMPUTER NETWORK

(75) Inventors: Ron Barzel, Truckee, CA (US); Felix S. Hsu, Fremont, CA (US); Ronald S. Cok, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 337 days.

(21) Appl. No.: 13/161,601

(22) Filed: Jun. 16, 2011

(65) Prior Publication Data

US 2012/0323988 A1  Dec. 20, 2012

(51) Int. Cl.
*G06F 15/16* (2006.01)
*G06F 9/50* (2006.01)
*H04L 12/26* (2006.01)

(52) U.S. Cl.
CPC ............. *G06F 9/5027* (2013.01); *H04L 43/08* (2013.01); *G06F 2209/5021* (2013.01)

(58) Field of Classification Search
CPC ........................................ H04L 43/08

USPC ..................... 709/202, 203; 707/12
See application file for complete search history.

(56) References Cited

U.S. PATENT DOCUMENTS

| | | | |
|---|---|---|---|
| 5,603,031 A | 2/1997 | White et al. | |
| 6,067,580 A | 5/2000 | Aman et al. | |
| 6,304,967 B1 | 10/2001 | Braddy | |
| 7,154,621 B2 * | 12/2006 | Rodriguez et al. | 358/1.15 |
| 7,184,425 B2 * | 2/2007 | Carlsson | 370/345 |
| 7,284,067 B2 | 10/2007 | Leigh | |

* cited by examiner

*Primary Examiner* — Adnan Mirza
(74) *Attorney, Agent, or Firm* — Hogan Lovells US LLP

(57) ABSTRACT

A method of allocating computing tasks in a communication network comprises providing a server that sends a request with an expiration time over the network to one or more processor computers for an allocation of a processing task to be performed by the server computer. The server computer performs the allocated processing task to completion if it's received within the expiration time and only if a higher priority task is not received before processing is completed.

16 Claims, 9 Drawing Sheets

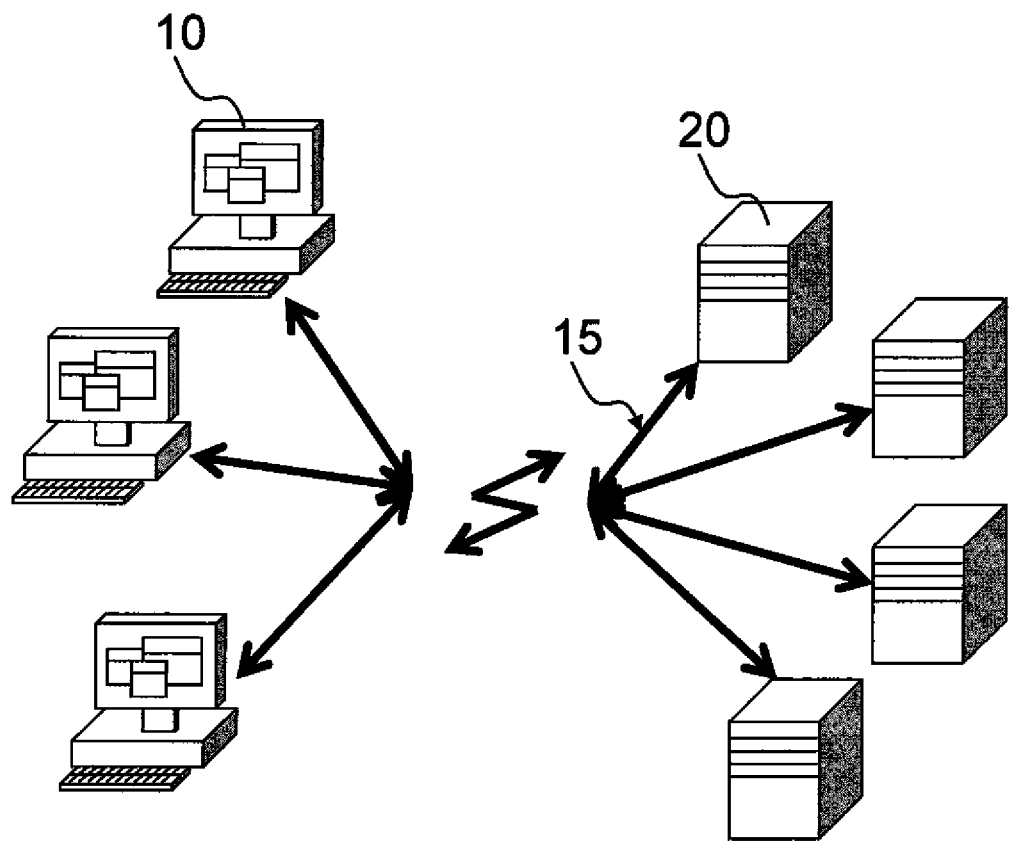
Fig. 10 – prior art

TASK ALLOCATION IN A COMPUTER NETWORK

CROSS REFERENCE TO RELATED APPLICATIONS

Reference is made to commonly assigned, co-pending U.S. Patent Applications:
Ser. No. 13/161,627 by Barzel et al. filed of even date herewith entitled "Task Allocation In A Computer Network";
Ser. No. 13/161,611 by Barzel et al. filed of even date herewith entitled "Image Processing In A Computer Network"; and
Ser. No. 13/161,634 by Barzel et al. filed of even date herewith entitled "Image Processing In A Computer Network", the disclosures of which are incorporated herein by reference in their entireties.

FIELD OF THE INVENTION

The present invention relates to the allocation of computing tasks in a network of computers.

BACKGROUND OF THE INVENTION

The distribution of work among a limited number of workers is a common problem found in everyday life. In one simple approach, each worker maintains a queue of tasks to keep busy. At times, however, a worker can complete the tasks and await further work, wasting time. In another simple approach, all tasks are allocated to a central task allocator. The central task allocator can monitor and dispatch tasks to the workers so that no workers are without work. Workers can have only one task in their queue at a time, or multiple tasks.

Computing task distribution among interconnected computers is an important problem in computer networks. Referring to FIG. 10, computer networks typically include multiple computers (e.g. client computers 10 and server computers 20) connected to a common computer communication network 15, for example the internet. In some computer networks, a server computer 20 provides services to a client computer 10. The client computer 10 can be a remote computer that accesses services over the computer network 15. The server computer 20, in turn, can access other networked computers providing services useful to the client for the benefit of the client instead of requiring the client to directly access those networked computers. In other computer networks, a group of computers is used to compute a single task, by dividing the task into separate portions that can be processed by different computers in the group of computers. In yet another arrangement, a group of computers receives multiple tasks. The multiple tasks are distributed among the computers in the group by a control computer. The control computer allocates tasks among the computers in the group and endeavors to ensure that each computer in the group has the same amount of work so that the computing load is balanced. If a group of computers does not have a balanced load, some of the computers can be idle while other computers can be inundated with tasks, thereby reducing the computing efficiency of the group of computers. Thus, it is important that a group of computers applied to a plurality of computing tasks be load balanced.

A great deal of attention has been given to load balancing computing tasks for groups of computers, both for dedicated processing networks and groups of computers available over the internet. Many such computing groups employ a controller to allocate tasks among the computers in a group. Tasks are sent to the controller, the controller tracks the task load of each computer in the group, and allocates new tasks to those computers having the smallest load. For example, U.S. Pat. No. 6,067,580 describes a distributed computing environment with an integrated work load manager to intelligently dispatch remote procedure calls among available application servers. Similarly, U.S. Pat. No. 6,304,967 discloses a computer network with one or more client computers. The client computers make requests to a first server computer that examines resources available on the first server computer and one or more second server computers and allocates the requests to load balance the requests among the first and second server computers. However, this approach requires the use of a controlling or allocating computer to distribute and track computing tasks and computer loads. Furthermore, the computing resources necessary to complete some indeterminate computing tasks, such as some image rendering tasks, are very unpredictable. Hence, simply tracking task allocation does not necessarily provide effective load balancing in a group of server computers, since a server computer could have fewer tasks but more work.

In another approach described in U.S. Pat. No. 5,603,031, a distributed computing environment employs agent processes that direct their own movement through a computer network. Agent processes can clone themselves when traveling along different network paths. Another method for balancing loads among server computers is described in U.S. Pat. No. 7,284,067. In this method, a load-balancing module is provided for each server and includes multiple network ports for receiving network traffic and coupling messages to its server or another module. Each module monitors the loading and health of its server and provides this information to the other modules. One or more master modules are directly connected to an external network and route received traffic based on a priority system. While these approaches provide a more distributed control and monitoring structure, they do not necessarily allocate indeterminate computing tasks effectively over a network of computers. Furthermore, the use of central task allocation modules creates potential computing bottlenecks and the need to monitor and communicate the status of each server to every other server creates overhead that can reduce the overall efficiency of the system.

Task responsiveness and efficiency are important characteristics of any computer application running on a computer network and are important issues for network service providers. In typical systems, a plurality of distributed client computers interacts with a different plurality of servers to perform a wide variety of different tasks. Since the tasks are often interactive and depend on a variety of different users with different objectives, the tasks tend to be unpredictable. Furthermore, as noted above, some of the tasks are indeterminate, that is the amount of time required to complete the task with a known resource cannot be readily determined. Hence, a system in which a task allocation computer distributes tasks to a group of server computers can be inefficient, create a communication or computing bottleneck, and provide poor load balancing. Alternative distributed processing systems can require a large amount of monitoring and communication overhead. Simply increasing the available network bandwidth or computing devices can be expensive.

In some applications, server computers can have different attributes or functions, for example storage facilities or processing capabilities. For example, in data-intensive applications, such as imaging applications, some server computers are responsible for storing and retrieving the data, while other server computers are responsible for processing the data. In such an arrangement, it is possible that a storage computer can be idle while a processor computer is busy, for example if the data retrieval time is less than the processing time or if multiple storage computers are employed and only a subset of the storage computers are employed to retrieve or store data for a data processing-task.

There remains a need, therefore, to improve networked computer services and provide responsive and efficient performance for given network and computing resources.

SUMMARY OF THE INVENTION

A preferred embodiment of the present invention comprises a method of allocating computing tasks in a communication network wherein server computers and one or more processor computers are all coupled to the communication network. The server computers receive server tasks over the communication network and the processor computers receive processing tasks over the communication network. A request for an allocation of a processing task is sent by one or more of a plurality of server computers to the one or more processor computers. The task requests include an associated expiration time. The one or more processor computers receive the task requests and allocate processing tasks to the requesting server computers within their expiration times. The server computers perform the allocated processing tasks to completion only if a higher priority task is not received before completion of the task. The requesting server computers respond to the one or more processor computers with processed data or allocated processing task status information. The server tasks include storing and retrieving digital images from a storage device associated with the server computer while the processor tasks include processing of digital images. It is permissible that two or more server computers request processing tasks from a single one of the one or more processor computers. Each of the server computers can be grouped, i.e. logically assigned, or associated, with one of the processor computers wherein the server computers request processing tasks only from the associated processor computer. A central repository for task requests can be implemented in the network for allocating the task requests among the plurality of processor computers. A workload status for the processor computers can also be maintained in the central repository. The task requests can include an associated expiration time as well as an associated computer network location. The processor computer can allocate a processing task for which the task is associated with the network location such as processing an image that is stored at the requesting server (storage) computer.

A further preferred embodiment of the present invention comprises a method of a server computer requesting a processing task from a processor computer wherein the task request includes an associated expiration time and an associated task type wherein the processor computer receives the task request and allocates a processing task of the associated task type to the requesting server computer within the expiration time.

A further preferred embodiment of the present invention comprises a method of allocating computing tasks in a communication network comprising providing one or more processor computers coupled to the communication network and receiving processing tasks over the communication network. The task requests include an associated expiration time whereby the processor computers allocate a processing task to the one of the plurality of server computers within the expiration time. The processor computers receive a notification of a failed processing attempt from the server computer caused by a higher priority task received thereby.

Another preferred embodiment of the present invention comprises a method of allocating computing tasks in a communication network comprising providing a server computer coupled to the communication network wherein the server computer receives server tasks over the communication network. The server computer sends a request with an expiration time over the network to one or more processor computers for an allocation of a processing task to be performed by the server computer. The server computer performs the allocated processing task to completion if it's received within the expiration time and only if a higher priority task is not received before processing is completed.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

FIG. 10 is a prior-art computer system and network.

DETAILED DESCRIPTION OF THE INVENTION

The present invention addresses the efficient allocation of processing tasks among a plurality of interconnected computing resources, particularly where one of the interconnected computing resources has a capability not shared by all of the interconnected computing resource, for example data-storage capabilities, operating upon particular data elements, or data-processing capabilities. In particular, the present invention is useful for imaging systems in which a plurality of image-storage computers each store a different subset of images and are interconnected to a set of image-processing computers that process the images. One or more of the processing tasks can be indeterminate. An indeterminate processing task is one for which it is difficult or impossible to predict the amount of time needed to accomplish the processing task with a given resource. Image processing or image rendering tasks can, in some cases, be indeterminate.

The computing resources can be heterogeneous so that one computing resource can have different computing, communication, or storage capabilities from another. Tasks can originate from a variety of sources and can be initially assigned to any one of the one or more interconnected computing resources. The computing resources can be interconnected through a computer communication network, such as an Ethernet network and can be interconnected through the Internet. As used herein, a processing task is a task performed by a computer and is also called a computing task, task, or job. A computing resource can be referred to as a computer. The computer can include a stored program processor system with a central processing unit, multiple memory devices, either volatile or non-volatile and a connection to the computer communication network, also called a network. Computers, processors, programs, storage, data, and communication networks are all known in the computer arts.

Figure 1:
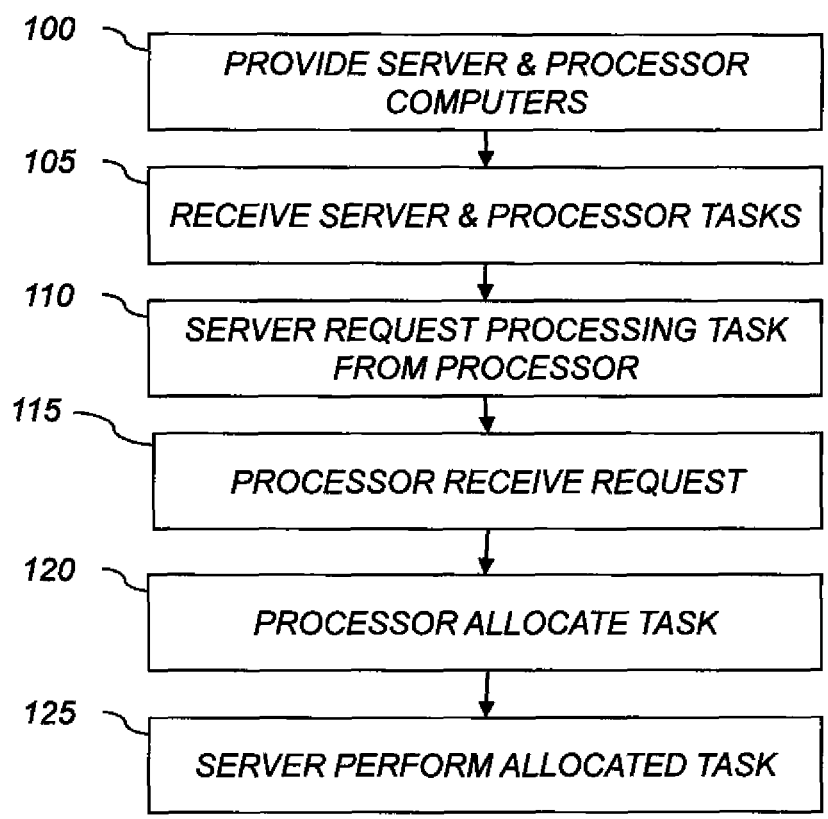
FIG. 1 is a flow diagram illustrating an embodiment of the present invention.

Referring to the flow graph of FIG. 1, a method of allocating computing tasks in a computer network comprises the steps of providing in step 100 a plurality of server computers and one or more processor computers, the server computers and processor computer(s) being interconnected through the computer network. In step 105, a set of first-priority server tasks is received and distributed to the server computers and a set of first-priority processing tasks is received and distributed to the processor computer(s). A processing task is requested by a server computer having available processing time from a processor computer, the task request having an associated expiration time, in step 110. The expiration time can be either a time available to receive a task or the time available to complete a task. In step 115, the task request is received by the processor (allocator) computer and a processing task allocated to the requesting server computer within the expiration time in step 120. In step 125 the allocated processing task is performed by the requesting server computer at a second priority less than the first priority. As used herein "lower priority" also refers to a priority that is less than another priority. A computer with a first task that has a higher, or greater, priority than another second task performs the first task in preference to the second task.

In one preferred embodiment of the present invention, a processor computer is intended primarily for processing data, for example images, while a server computer is intended primarily for storing and retrieving data. However, processor computers can also store data and provide the data to other interconnected computers. In particular, according to the present invention, the server computers also process data. Both processor and server computers can be constructed using existing, commercially available computing hardware. The processor and server computers can comprise identical hardware but, according to one preferred embodiment, the server computers can access large amounts of associated, non-volatile data storage devices.

In an example according to a preferred embodiment of the present invention, the processor computers are image-processing computers and can include hardware intended to facilitate image processing, such as large amounts of volatile memory and image-processing circuitry. The server computers are image-storage and retrieval computers and can include hardware intended to facilitate image storage and retrieval, such as large amounts of non-volatile memory and high-bandwidth network connections. Processing tasks can include the processing of digital images. Images are stored on the interconnected image-storage computers and image processing tasks are generally allocated to the image-processing computers. Image-storage and retrieval tasks are the highest-priority tasks for the image-storage computers while image-processing tasks are the highest-priority tasks for the image-processing computers. The image-processing tasks typically require the retrieval of images stored on the image-storage computers. Not all of the image-storage computers are active at the same time and at least one of the image-storage computers have at least partially idle processors at some point in time.

The image-storage computers having idle, or partially idle, processors can request that image-processing tasks be transferred from the image-processing computers to them. Each of these image-processing-task requests has an associated expiration time. The expiration time guarantees a minimum performance for image storage and retrieval by the image-storage computer since, if a transferred image-processing task is too large, it can be abandoned, or the processing time made available is limited to the expiration time so that if a storage request is received it can be processed in preference to the image-processing task (since the storage task has a first priority higher than the second priority of the image-processing task on the image-storage computers). Alternatively, a received image-processing task can be abandoned if a storage request is received while the image processing is under way. Hence, the image-processing tasks undertaken by the image-storage computers are performed at a second priority less than the first priority image storage tasks. In one preferred embodiment of the present invention, the expiration time is selected based on a statistical expectation of storage task duration or based on a history of image-storage tasks received by the image-storage computer or the plurality of image-storage computers. Since image-processing tasks can be indeterminate, the method of the present invention can provide a robust means to improve system efficiency in the presence of a variable and possibly uncertain task load. Furthermore, the method of the present invention scales effectively to a large number of storage and processing computers on a common network.

If image-processing work is available, a task can be allocated from an image-processing computer to the requesting image-storage computer having an idle or partially idle processor within the expiration time. If no image-processing task is available within the expiration time, no further action is taken. If an image-processing task is allocated from an image-processing computer to an image-storage computer, the receiving image-storage computer can begin processing the task. If the task is completed by the image-storage computer, the process can end. If the task is not completed, for example because the task is too large or the image-storage computer is interrupted to do a higher-priority task, the image-processing task can be abandoned. In various preferred embodiments of the present invention, the allocating processor or a task allocation computer can be informed and the image-processing task re-allocated to an-image processing computer, to another image-storage computer, or to the same image-storage computer. Although in this example, the data stored and processed are images, the present invention is not limited thereto.

Figure 2:
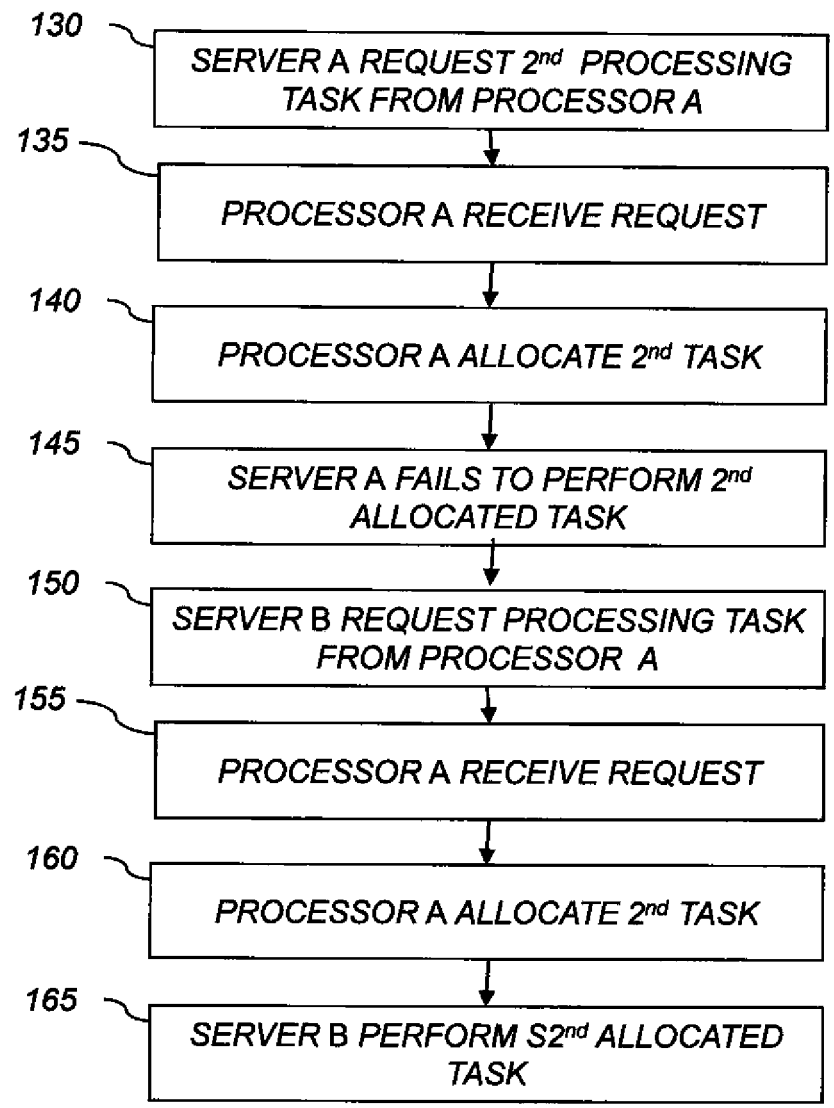
FIG. 2 is a flow diagram illustrating another embodiment of the present invention.

Therefore, referring to FIG. 2 in one preferred embodiment of the present invention, in step 130 a server computer (designated 'server A' in FIG. 2) having idle processing time can request a second processing task from a processor computer (designated 'processor A' in FIG. 2) after completing processing of a first task from a processor computer. The second task request has an associated expiration time. The second task request by the server computer A is received (step 135) by the processor computer A and allocated (step 140) to the requesting server computer A within the expiration time. Thus, the process described above with respect to FIG. 1 can be repeated.

In one preferred embodiment of the present invention, the allocated second task can be performed by the server computer A (FIG. 1). In another preferred embodiment (FIG. 2), the server computer A fails to perform the allocated second processing task (step 145) and informs the processor computer A. In this latter case, the second processing task can be re-allocated to server computer B also having idle processing time. Server computer B requests the second processing task in step 150, processor A receives the request in step 155 and the second processing task is allocated to server computer B in step 160, which performs the allocated second processing task in step 165. Thus, according to a preferred embodiment of the present invention, tasks can be reallocated from one first server computer to another second server computer if the first server fails to perform the allocated task.

Task requests and task allocations can be performed through inter-computer messages, as are known in the computing network arts. Server computers can initiate communications with processor computers in a one-to-one or broadcast communication. The communication can include server processor data such as idle time and data or reference to stored data. This information can assist a processor computer in allocating tasks, if more than one is task is available, or in selecting server computers to perform a task, if more than one server is available.

Processor computers can respond to the server computers by allocating a task, for example including data (for example images), processing task list, and executable code or instructions. If the data is stored at the receiving server computer, it need not be communicated as part of the task transfer. Alternatively, the data can be retrieved a second time from the storage computer in which is it held. If the data is not successfully processed, the failed server computer can communicate the status to the processor computer. If the data is successfully processed, the server computer can respond to the processor computer with the processed data and transferred task status information.

Figure 3:
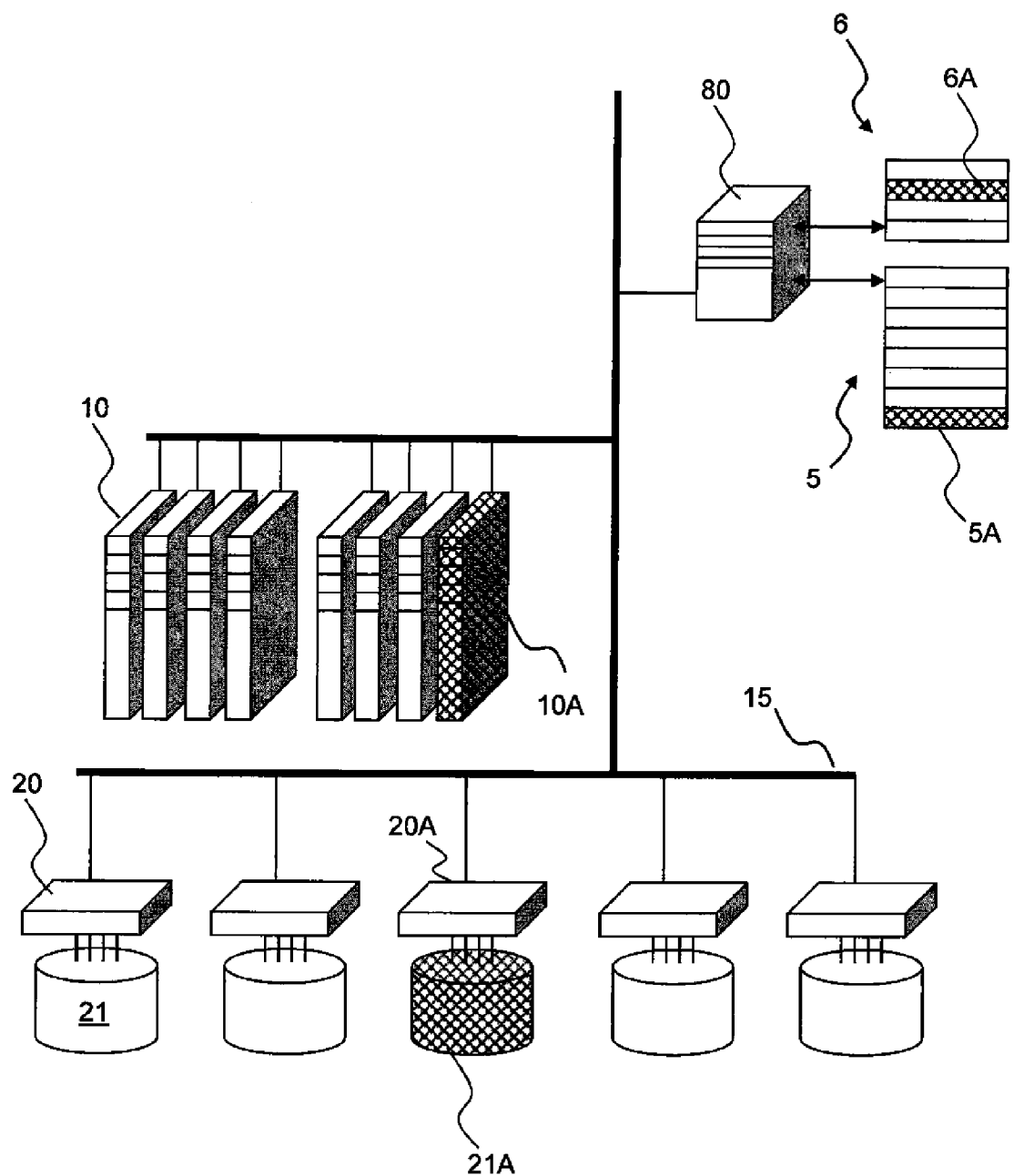
FIG. 3 is a schematic diagram illustrating a system useful in understanding an embodiment of the present invention.
Figure 4:
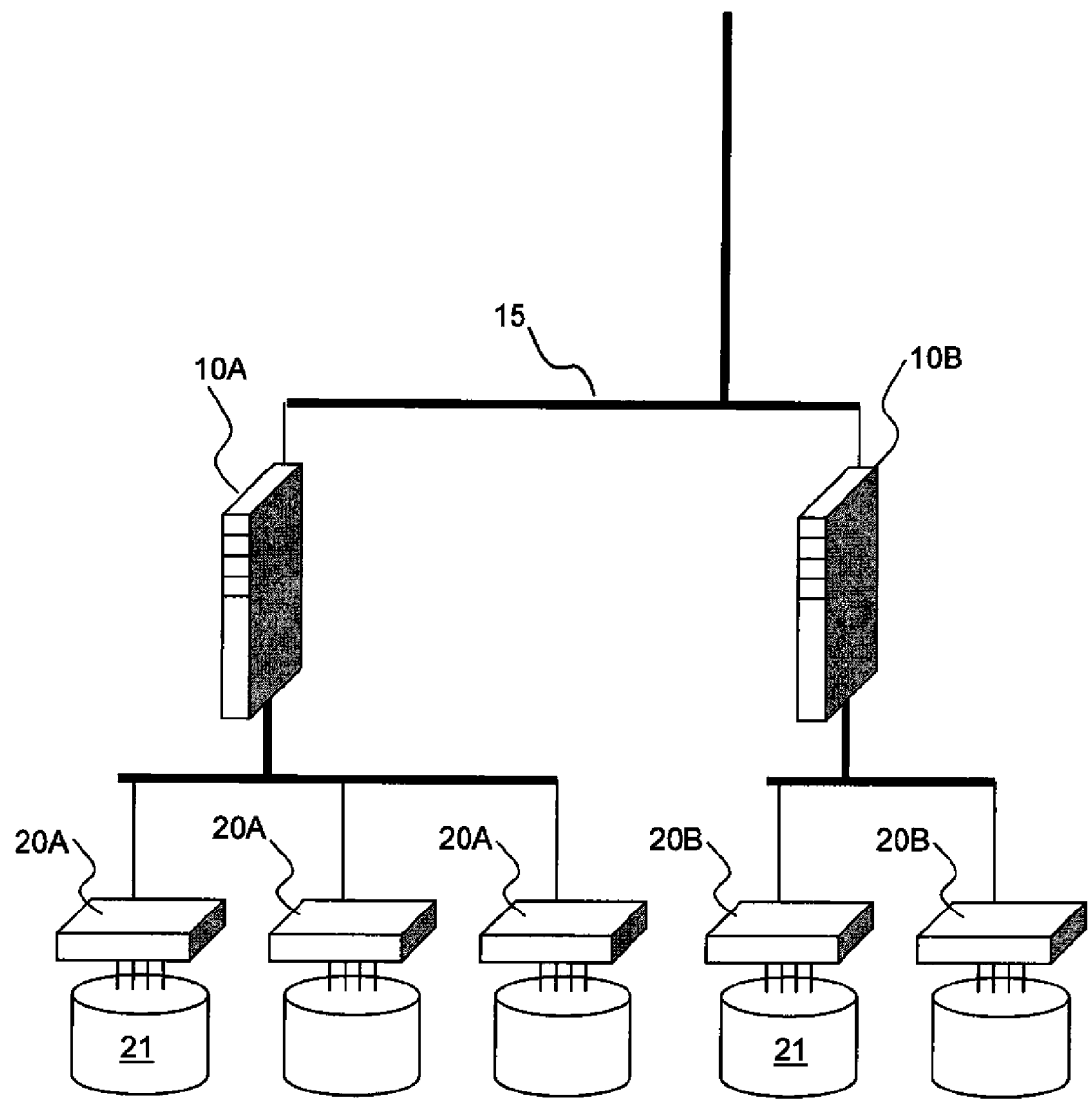
FIG. 4 is a schematic diagram illustrating an alternative system useful in understanding an embodiment of the present invention.
Figure 8:
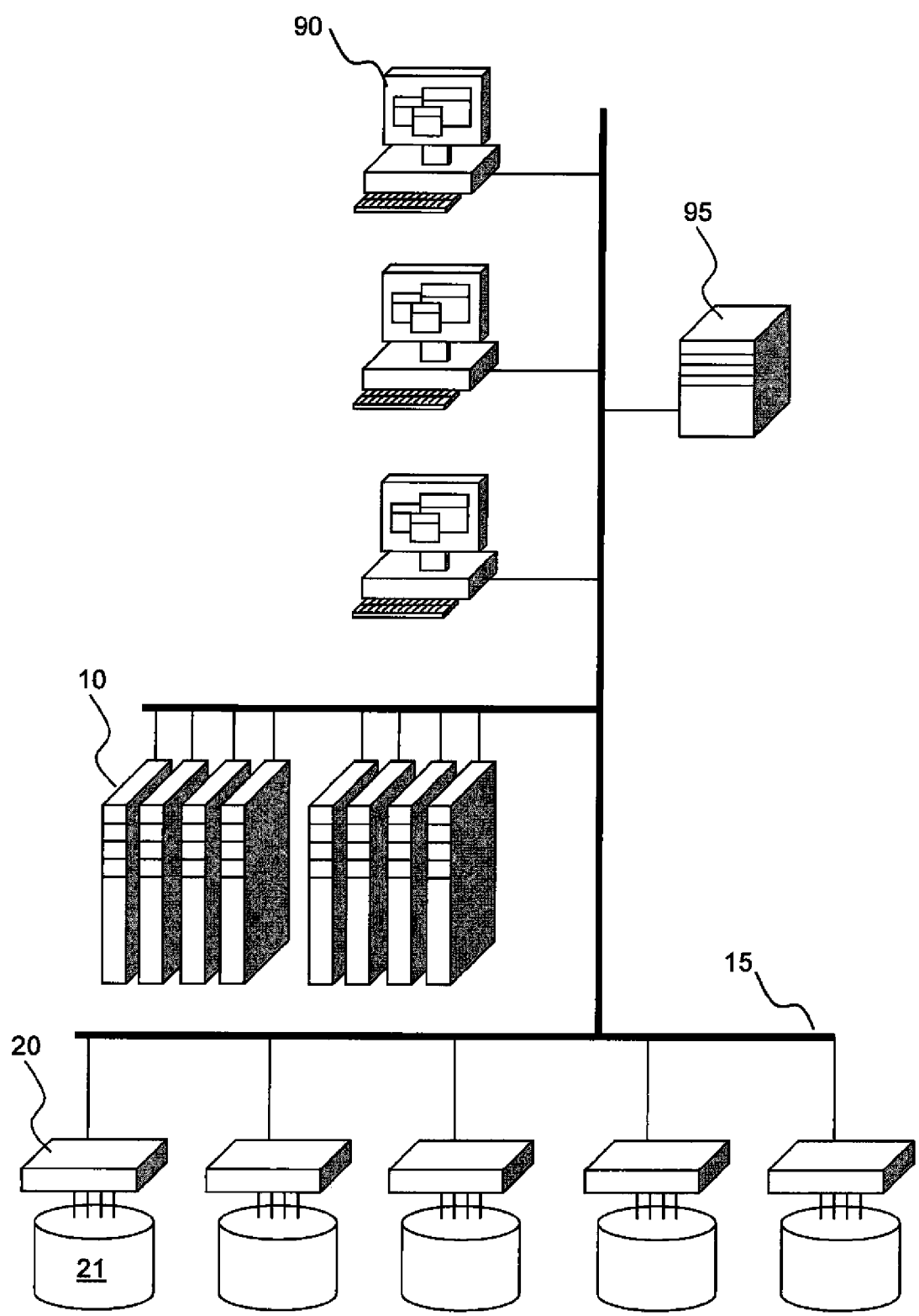
FIG. 8 is a schematic illustration of a server computer system useful in the present invention.

In various preferred embodiments of the present invention illustrated in FIGS. 3, 4, and 8, a plurality of processor computers 10 and a plurality of server computers 20 each having a storage device 21 are provided on a common computer network 15. More than one server computer 20 at one time can have idle processors and can request tasks from one or all the processor computers 10. Alternatively, as illustrated in FIG. 4, a subset of server computers 20A can be associated with a subset of processor computers 10A. Similarly, a subset of server computers 20B can be associated with a subset of processor computers 10B. For example, given more server computers 20 than processor computers 10, each processor computer 10A can be associated with five server computers 20A while processor computer 10B can be associated with two server computers 20B. Each of the server computers 20A or 20B can then request work from the one associated processor computer 10A or 10B, respectively. Dividing the server computers 20 into groups associated with one or more processor computers 10 can simplify the structure and reduce the amount of inter-processor communication.

In a further preferred embodiment of the present invention shown in FIG. 3, a central task allocation processor 80 is employed to allocate tasks to idle server computers 20. The central task allocation processor 80 has an associated list of processing tasks 6 and list of status states 5 for the servers 20. If a server 20 is idle, for example server 20A having storage device 21A, it communicates its status to the central task allocation processor 80 which then updates the server status 5A of server 20A. The central task allocation processor 80 can then allocate a task 6A from a list of tasks 6 to the server 20A and then update the task list 6 and server status list 5. In a preferred embodiment, the processor computer 10A is initially given task 6A and the central task allocation processor 80 can re-allocate the task 6A from processor computer 10A to server computer 20A. Alternatively, the task 6A can be held by the central task allocation processor 80 until either a processor computer (e.g. processor computer 10A) or a server computer (e.g. server computer 20A) is free, and then the central task allocation processor 80 can allocate the task 6A as appropriate.

In another preferred embodiment of the present invention, a central task allocation processor 80 can maintain a workload status for the processor computers 10 in the central repository and allocate tasks among the plurality of processor computers 10 according to the relative workload status of the processor computers 10. Similarly, the central task allocation processor 80 can maintain information with respect to the server computers 20. If a task is to be performed by a server computer, the task can be preferentially assigned to a server computer 20 at a network location that stores data relevant to the task in a connected storage device 21.

In a further preferred embodiment of the present invention, a computer system for allocating computing tasks in a computer network includes a plurality of server computers, one or more processor computers, and a computer network, the server computers and processor computer(s) being interconnected through the computer network. A set of first priority server tasks is provided to the server computers and a set of first-priority processing tasks is provided to the processor computer(s). The server computers are adapted to request a processing task from a processor computer, the task request having an associated expiration time, the processor computer (s) are adapted to receive the task request and to allocate a processing task to the requesting server computer within the expiration time, and the server computers are adapted to performing the allocated processing task at a lower second priority with respect to the server tasks.

In further preferred embodiments of the present invention, the requesting server computer is adapted to respond to the processor computer. The response can include processed data or allocated processing task status information and the server tasks can include the storing and retrieval of digital images from a storage device. The processor tasks can include the processing of digital images.

In other preferred embodiments of the present invention, two or more server computers are adapted to request processing tasks from a single processor computer. The present invention can include a plurality of processor computers. The server computers can be divided into groups, each group of server computers associated with a processor computer and the server computers include software adapted to requesting tasks from the corresponding associated processor computer.

In another preferred embodiment, a central repository for task requests is adapted to allocate the task requests among the plurality of processor computers. The central repository is adapted to maintain a workload status for the processor computers and allocates the task requests among the plurality of processor computers according to the relative workload status of the processor computers. Alternatively, processor computers could exchange tasks with other processor computers to balance the work load among the processor computers. If each processor computer is associated with the same number of server computers, the work load will be roughly balanced.

A server computer can be adapted to request a processing task from a processor computer, the task request having an associated expiration time and an associated computer network location. A processor computer can be adapted to receive the task request and to allocate a processing task to the requesting server computer within the expiration time and for which the allocated processing task is associated with data stored at the network location.

A processor computer can be adapted to receive the task request and can be adapted to allocate an image processing task to the requesting server computer, the image processing task processing an image that is stored at the requesting server computer. A server computer can be adapted to request a processing task from a processor computer. The task request can have an associated expiration time and an associated task type. Software on a processor computer is adapted to receive the task request and allocate a processing task of the associated task type to the requesting server computer within the expiration time. Server computers can be adapted to execute some task types more efficiently than other task types, and different server computers can execute particular task types more efficiently.

A server computer can be adapted to request a second processing task from a processor computer, the second task request having an associated expiration time and the requested second processing task having a second priority to the server computer. The processor computer can be adapted to receive the second task request and allocate the requested second processing task to the requesting server computer within the expiration time. The requesting server computer can fail to perform the second allocated processing task, in which case the processor computer can allocate the second processing task a second time to a server computer requesting a processing task.

Networks of server computers can have a primary task (e.g. storing and retrieving images to a requesting computer). However, it can be the case that a server computer responsible for a particular data set (e.g. images) is not busy because the data stored at the processor are not requested, resulting in an inefficient use of resources. Preferred embodiments of the present invention increase the efficiency of these resources. Moreover, if the server computer network is owned by a third party, additional costs are incurred due to inefficiency.

By employing processor computers whose processing tasks can be reallocated to server computers, efficiency can be improved and costs reduced by employing otherwise idle server computers to process data, thereby load balancing the larger system (server and processor computers) appropriately. However, according to the present invention, processor computers cannot simply allocate tasks to idle server computers, since the idle server computers can be requested to respond to data requests after such an allocation and are therefore no longer idle. For example, if the server computer is busy retrieving data, the allocated data processing task can be done too slowly. While the processor computers could each maintain a status for any associated server computers, this can be inefficient, redundant, and difficult, especially if the server computers are owned by a separate business entity.

Hence, according to preferred embodiments of the present invention, the server computers, when at least partially idle, create task requests that have an expiration time. The task requests are distributed to one or more processor computers, and tasks are allocated from the processor computers to the requesting server computers. Thus, the server computer maintains control of the work intake and can perform the tasks at a lower priority than the primary data-serving task of the server computer. The priority of the tasks allocated to the server can be controlled by the server computer in view of the server computer's statistical expectation of task load over the expiration time period.

Figure 7:
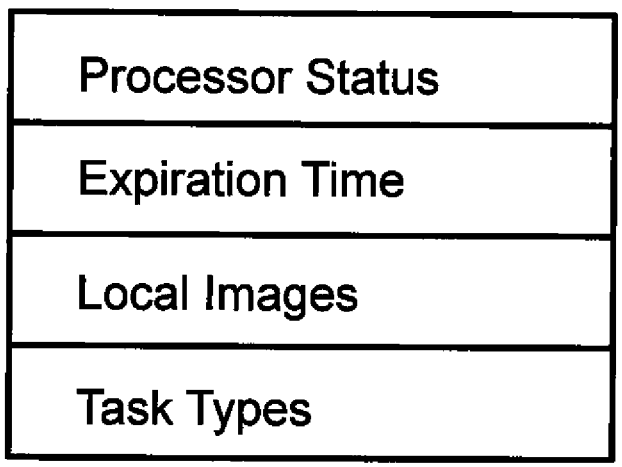
FIG. 7 is a task request record useful for the present invention.
Figure 9:
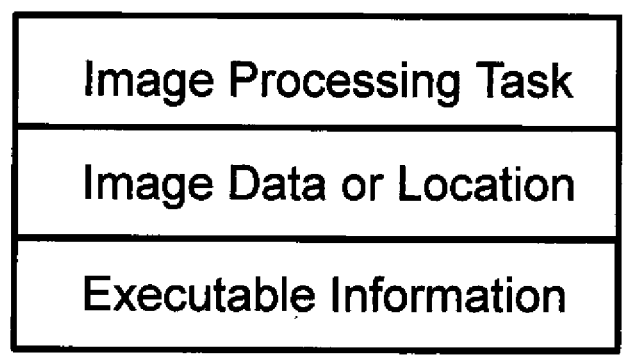
FIG. 9 is a task allocation record useful for the present invention.

In a further preferred embodiment, task requests, as illustrated in FIG. 7, can include information relevant to the data, resources, or status of the requesting server computer such as the processor status or type, locally stored data such as images, and preferred task types so that tasks can be preferentially allocated to the most suitable server computer (e.g. the server computer with the best resources, lowest work load, or most locally stored data). If the server computer cannot perform the work requested, it is preferred that the task be abandoned as quickly as possible and re-allocated, for example by informing the allocating processor computer. A task allocation, as illustrated in FIG. 9, can also include different kinds of information, including the processing task, relevant data or references to the relevant data location, or even executable or interpretable code.

Referring to FIG. 8, tasks can originate from client computers 90 connected to the network 15. Web page server 95 can interact with the remote client computers 90 to provide user interface, data, and operational instructions to the remote client computers 90. In response to information provided by the web page servers 95, a user working at a remote client computer 90 can request images from server computers 20 stored on storage devices 21 that are processed by process computers 10 or server computers 20 as described above. Alternatively, as illustrated in FIG. 3 and described above, task allocating computer 80 can receive and aggregate tasks originating from remote clients 90 in a list 6 for immediate or later allocation.

According to a preferred embodiment of the present invention, the plurality of processing tasks can be received from a plurality of different sources on the computer network and each of the plurality of sources can independently provide work to different ones of the plurality of server computers. For example, the plurality of different sources can be remote client computers 90 and 10 as illustrated in FIGS. 8 and 10, respectively.

The present invention has the advantage of effectively managing a diverse set of server computers, processor computers, and client computers with different processing, communication, and storage capabilities, without additional management overhead. For example, the server or processor computers can have similar computing attributes or can have dissimilar computing attributes. Although, on an instantaneous basis, the system of the present invention is not fair (that is the load balancing is not guaranteed to be optimal) over time the system is self-correcting and load balancing and very robust, as well as scaling effectively with little overhead and oversight. Moreover, the present invention adapts well to a wide variety of computing resources and bandwidth and to changes in the available resources and bandwidth. It also adapts well to processing structures in which some portions of the system (e.g. the server computers) are owned by a different commercial entity than the processor computers or computers that provide web page support to remote client computers.

A model of the system and method of the present invention has been made, tested, and demonstrated to be robust and scale effectively.

Figure 5:
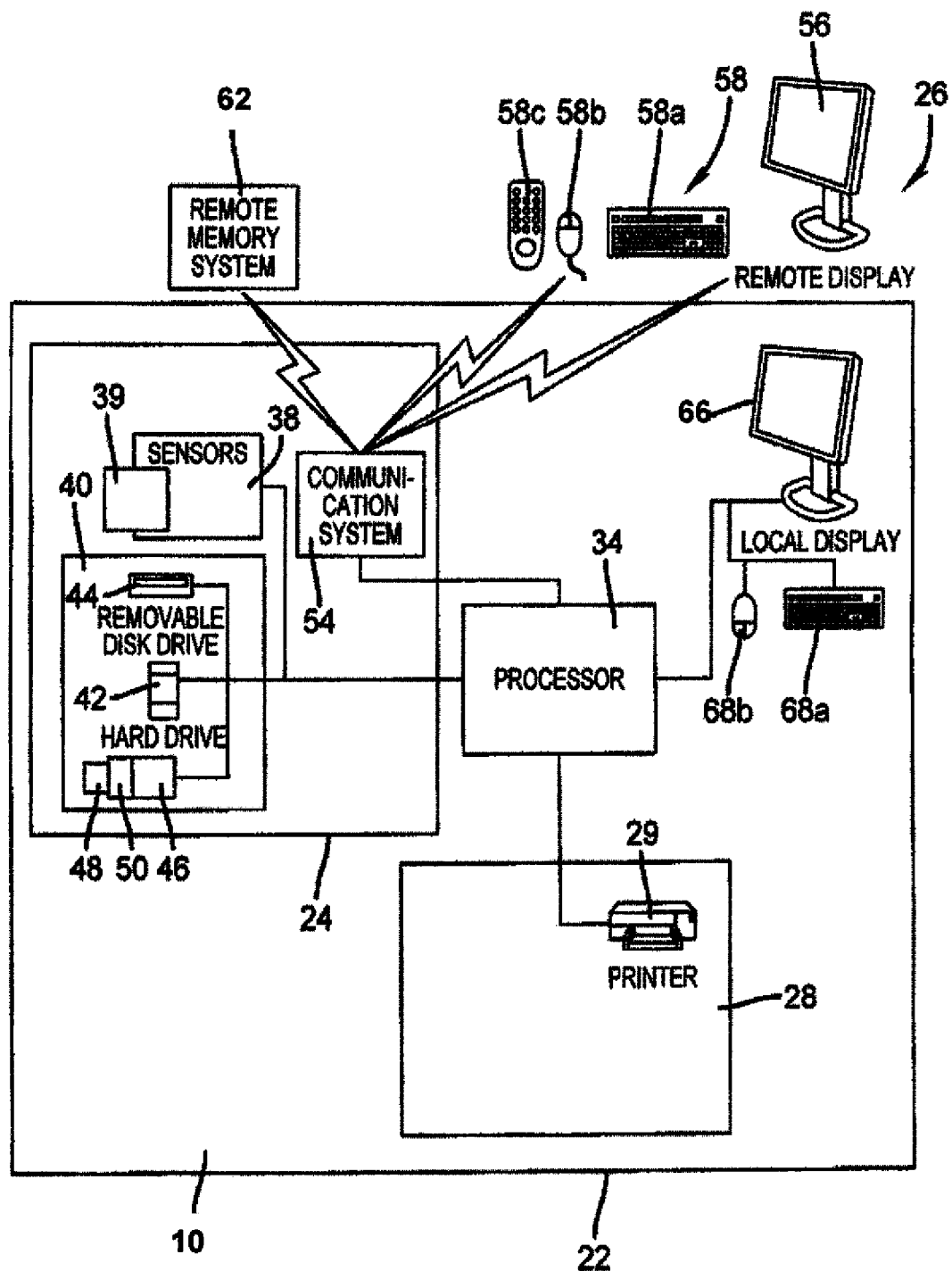
FIG. 5 is a schematic illustration of a server computer system useful in the present invention.

The present invention is adapted to receive images and provide processed images that can be used to make image prints or other image-related products. FIG. 5 illustrates a first preferred embodiment of an electronic computer system 20 that can be used as a processor or server computer (e.g. 10 or 20 in FIG. 3) for processing or providing image files for the present invention. In the preferred embodiment of FIG. 5, the computer system 10 or 20 comprises a housing 22 and a source of image data files such as digital images that have been prepared by or using other devices. In the preferred embodiment of FIG. 5, source of image data files 24 includes sensors 38, a memory 40 or a communication system 54.

Sensors 38 are optional and can include light sensors, a camera and other sensors known in the art that can be used to obtain digital images in the environment of the system 10 and to convert this information into a form that can be used by processor 34 of the system. Sensors 38 can also include one or more video sensors 39 that are adapted to capture images.

Memory 40 can include conventional memory devices including solid state, magnetic, optical or other data storage devices for storing images, image products, etc. Memory 40 can be fixed within the system or it can be removable. In the preferred embodiment of FIG. 5, the system 10, 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, image processing software, control programs, digital images and metadata can also be stored in a remote memory system 52, corresponding to server memory 23 as described above (the server itself is not shown).

In the preferred embodiment shown in FIG. 5, communication system 54 that in this preferred embodiment can be used to communicate with an optional remote memory system 52, an optional remote display 56, or optional remote input 58 is included. A remote input station including a remote display 56 and/or remote input controls 58 (also referred to herein as "remote input 58") can communicate with communication system 54 wirelessly as illustrated or can communicate in a wired fashion. In an alternative preferred embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system.

User input system 26 provides a way for a user of the system to provide instructions to processor 34. This allows such a user to make a designation of image data files to be used in generating digital images and product specifications and to select an output form for the output product. User input system 26 can also be used for a variety of other purposes including, but not limited to, allowing a user to arrange, organize and edit digital images and products to be incorporated into the image product, to provide information about the user or audience, to provide annotation data such as voice and text data, to identify characters in the content data files, and to perform such other interactions with the system.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the preferred embodiment shown in FIG. 5, user input system 26 includes an optional remote input 58 including a remote keyboard 58a, a remote mouse 58b, and a remote control 58c and a local input 68 including a local keyboard 68a and a local mouse 68b.

Figure 6:
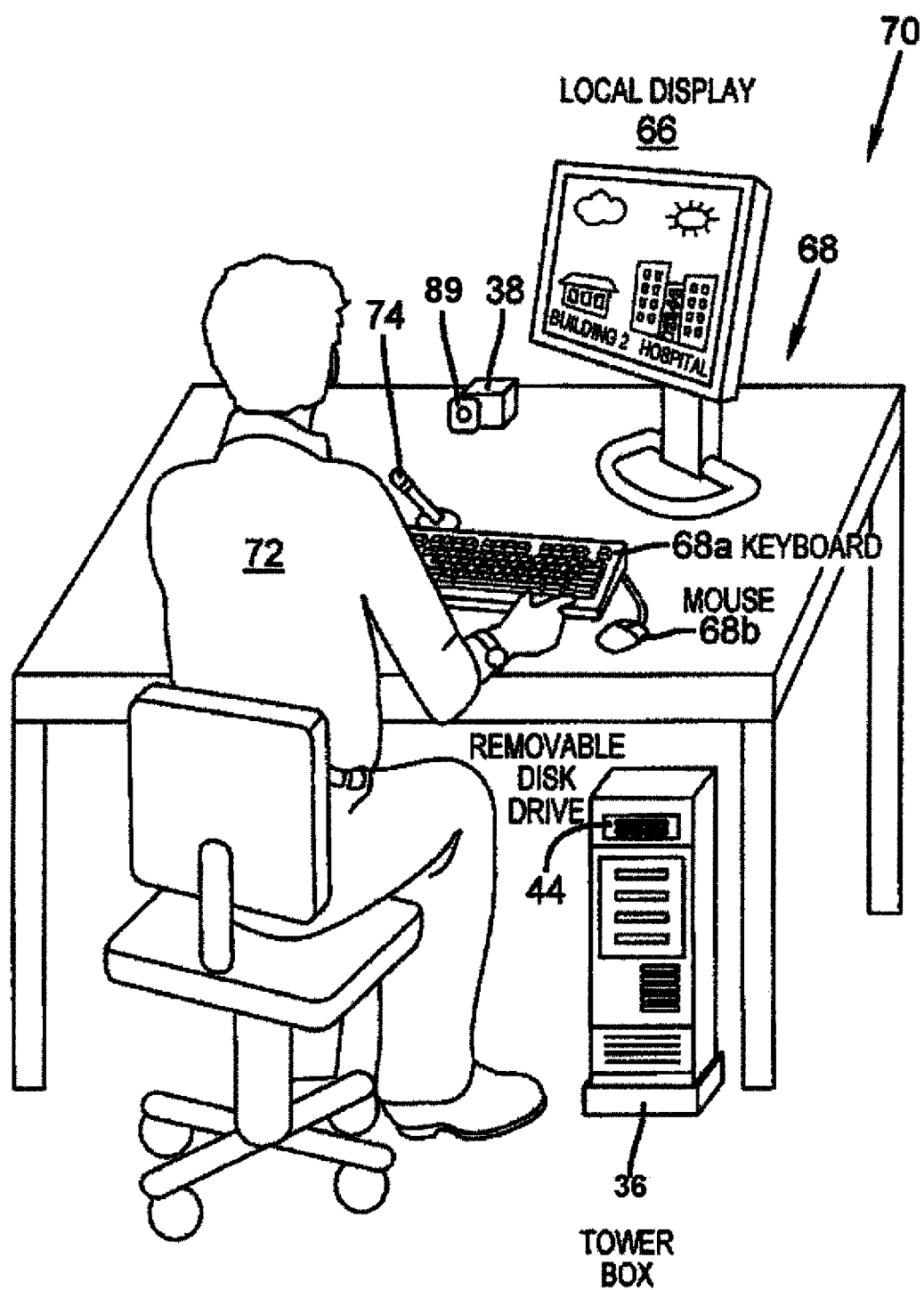
FIG. 6 is a schematic illustration of a user computer system useful in the present invention.

As is illustrated in FIG. 6, client input 68 for example from a client computer 90 can take the form of an editing studio or kiosk 70 (hereafter also referred to as an "editing area 70"). In this illustration, a user 72 is seated before a console comprising local keyboard 68a and mouse 68b and a local display 66 which is capable, for example, of displaying multimedia content. As is also illustrated in FIG. 6, editing area 70 can also have sensors 38 including, but not limited to, video sensors 39, audio sensors 74 and other sensors.

Output system 28 is used for rendering images, text or other graphical representations in a manner that allows digital images and product specifications to be designed and recorded. In this regard, output system 28 can comprise any conventional structure or system that is known for printing rendered image products such as on printer 29. Printer 29 can record images on a tangible surface 30 using a variety of known technologies. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale or sepia toned images.

In certain preferred embodiments, the source of content data files 24, user input system 26 and output system 28 can share components. Processor 34 operates system based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

The present invention can be employed to support business conducted over the internet, in particular for businesses that employ large amounts of digital storage, such as image printing for a client that interacts with a web server and image storage system. It has been shown that improved responsiveness, improved computational efficiency, and reduced complexity are provided by using the various preferred embodiments of the present invention.

The invention has been described in detail with particular reference to certain preferred embodiments thereof, but it will be understood that variations and modifications can be effected within the spirit and scope of the invention.

PARTS LIST

5 server status
5A server status state 6 processing tasks
6A processing task
10 processor computer
10A processor computer
10B processor computer
15 network
20 server computer
20A server computer
20B server computer
21 storage device
21A storage device
22 housing
24 source of content data files
26 user input system
27 graphic user interface
28 output system
29 printer
30 tangible surface
34 processor
35 remote system
38 sensors
39 video sensors
40 memory
42 hard drive
44 disk drive
46 memory card slot
48 removable memory
50 memory interface
52 remote memory system
54 communication system
56 remote display
58 remote input
58a remote keyboard
58b remote mouse
58c remote control
66 local display
68 local input
68a local keyboard
68b local mouse
70 home computer, editing studio, or kiosk
72 user
74 audio sensors
80 central task allocation computer
90 remote client computer
95 web server computer
100 provide server computers and processor computers step
105 receive processing tasks step
110 server request processing task step
115 processor receive request step
120 processor allocate task step
125 server perform allocated task step
130 request processing task request step
135 receive processing task request step
140 allocate processing task step
145 fail to perform allocated processing task step
150 request processing task request step
155 receive processing task request step
160 allocate processing task step
165 perform allocated processing task step

The invention claimed is:

1. A method of allocating computing tasks in a communication network, comprising the steps of:
provide a plurality of server computers and one or more processor computers all coupled to the communication network;
the server computers receiving server tasks over the communication network and the processor computers receiving processing tasks over the communication network;
a first server computer sending a task request to the one or more processor computers, wherein the task request asks the one or more processor computers to allocate a processing task to the first server computer, and wherein the task request comprises an associated expiration time;
the one or more processor computers receiving the task request;
at least one of the processor computers responding to the task request by allocating a processing task to the first server computer; and
the first server computer performing the allocated processing task to completion only if the allocated processing task is allocated within the associated expiration time and if the first server computer does not receive a higher priority task prior to completing the allocated processing task.

2. The method of claim 1, further including the step of the requesting first server computer responding to the one or more processor computers with processed data or allocated processing task status information.

3. The method of claim 1, wherein the server tasks include storing and retrieving digital images from a storage device.

4. The method of claim 1, wherein the processor tasks include processing digital images.

5. The method of claim 1, further including the step of two or more server computers requesting processing tasks from a single one of the one or more processor computers.

6. The method of claim 1, further including the step of providing a plurality of processor computers.

7. The method of claim 6, further including the step of logically associating each of the server computers with one of the plurality of processor computers.

8. The method of claim 7, further including the step of the server computers requesting a processing task only from an associated one of the plurality of processor computers.

9. The method of claim 6, further including the step of providing a central repository for task requests and allocating the task requests among the plurality of processor computers.

10. The method of claim 9, further including the step of maintaining a workload status for the processor computers in the central repository and allocating task requests among the plurality of processor computers according to a relative workload status of the processor computers.

11. The method of claim 1, wherein the task request further comprises an associated computer network location.

12. The method of claim 11, further including the step of a processor computer receiving the task request and allocating a processing task to the first server computer within the expiration time and for which the allocated processing task is associated with the network location.

13. The method of claim 12, further including the step of a processor computer receiving the task request and allocating an image processing task to the first server computer, wherein the image processing task requires processing an image that is stored at the requesting server computer.

14. The method of claim 1, wherein the task request further comprises an associated task type and the method further including the step of a processor computer receiving the task request and allocating a processing task of the associated task type to the requesting first server computer within the expiration time.

15. The method of claim 1, further including the the following steps: a second server computer sending a second task request to the one or more processor computers, wherein the second task request has an associated expiration time; the one or more processor computers receiving the second task request; at least one of the processor computers allocating a requested second processing task to the second server computer within the expiration time; and the second server computer failing to perform the requested second processing task due to receiving a higher priority task.

16. The method of claim 15, further including the step of a processor computer allocating the requested second processing task a second time to the second server computer.

* * * * *